Patented Feb. 25, 1930

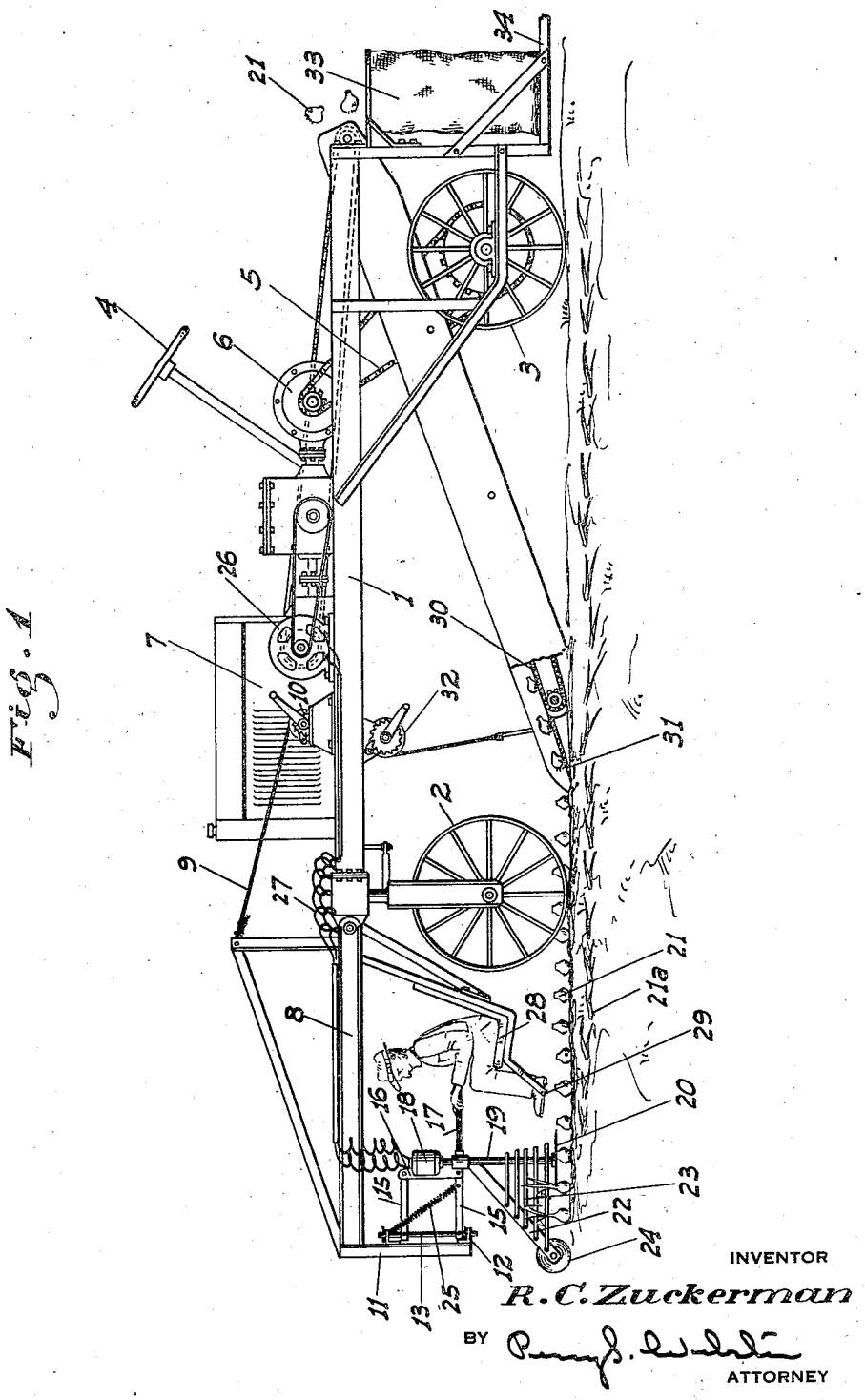

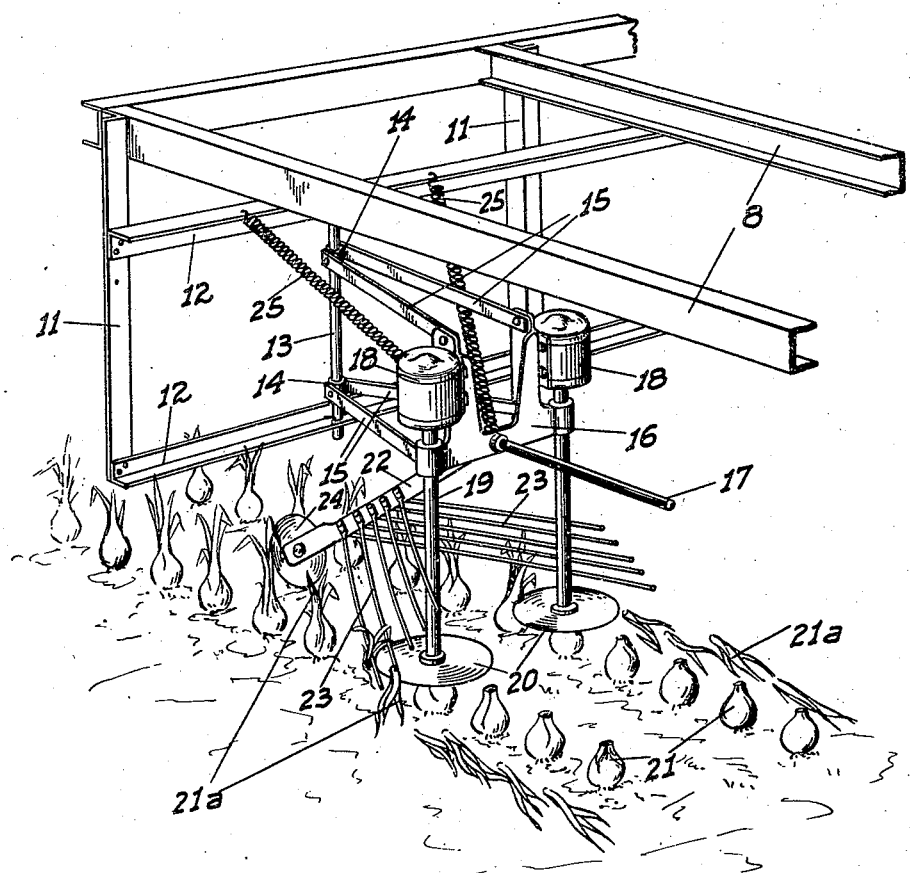

1,748,745

UNITED STATES PATENT OFFICE

ROSCOE C. ZUCKERMAN, OF STOCKTON, CALIFORNIA

ONION HARVESTER

Application filed December 13, 1929. Serial No. 413,814.

This invention relates to the art of harvesting onions, and particularly to a machine preferably for use in connection with carrying out that method of harvesting onions disclosed in my copending application for patent, Serial No. 406,725, filed November 12, 1929. Attention is directed to my copending application for patent, Ser. No. 414,094, filed Dec. 14, 1929.

The onions as they grow in the ground of course are of various sizes and are variously displaced vertically above or below the ground level, and for this reason it has always been somewhat difficult to harvest them by machinery, for the reason that to properly do so required they be topped and derooted before they were put into the containers, and due to the irregularities of position and size it has heretofore been a difficult matter to machine dig them, since no adequate means has been provided for effectually cutting the tops without injuring the bulbs.

Consequently the common method of harvesting onions up to the present time has necessarily been confined to hand labor. At maturity or while the onions are still growing they are pulled from the ground by hand. The pulled onions are then placed in windrows, care being taken that the bulbs of the onions with the long roots clinging thereto are placed in direct contact with the ground with the tops of the onions extending upwardly. The onions are then allowed to remain in these windrows until the tops dry and wither and the onions properly dry out and cure. The onions are then removed from the windrow by hand and the dried tops are cut off the same by manual operation, whereupon the onions are then suitably sorted, graded and placed in containers.

All of the manual labor has proven very unsatisfactory in practice, and very costly and quite inadequate to meet the needs of the producer; and I have therefore devised my improved method as set forth in the above identified application for patent, and in connection therewith it becomes practical to provide for machine digging of the onions, but this requires that the machine be so constructed and operated that the cutting of the tops of the onions may be effectually carried out without injuring the bulbs.

The object of the present invention therefore is primarily to provide a cutter for the onion harvester which may be so manipulated and controlled to effectually and rapidly cut off the tops of the onions as the harvester progresses, leaving the bulbs uninjured.

This object I have accomplished by a particular arrangement of cutter mounted upon and operable at the forward end of the digging means of the machine, which cutter is under the direct management and control of the operator, so that it may be rapidly adjusted vertically to be brought into contact with the tops of the onions at points as may be directed by the operator.

With this top cutting arrangement the harvesting of the onions is under absolute control to a point where they may be very rapidly dug from the ground and distributed into containers, which will result in the cost of harvesting being reduced to a minimum.

These objects I accomplish by means of such structure and relative arrangement of parts as will fully appear by a perusal of the following specification and claims.

In the drawings similar characters of reference indicate corresponding parts in the several views:

Fig. 1 is a side elevation of my improved harvester as in operation.

Fig. 2 is a perspective view of a hand controlled topping unit of the apparatus.

Referring now more particularly to the characters of reference on the drawings, the apparatus comprises a horizontal frame structure 1 supported at its forward end by steerable wheels 2 and adjacent its rear end by other wheels 3. The front wheels are steered by suitable connections with a steering wheel 4 and the rear wheels are driven by chains or similar connections 5 from a differential mechanism indicated at 6, which in turn is driven from a gas engine or similar power plant mounted on the frame 1 and enclosed in a hood or housing 7 as usual.

Projecting forwardly from the main frame 1 and hinged thereon is a rigid auxiliary frame structure which includes longitudinally extending beams 8. These beams are normally held on a level but are adapted to be raised from such level at will by one or more cables 9 extending about a hand controlled drum and hoist device 10 mounted on the frame 1.

This auxiliary frame supports the manually controlled onion topping units and their operators; there being as many separate units, each adapted to top two adjacent rows of onions simultaneously, mounted on the one frame as may be desired or found most practicable. Each such unit is constructed and mounted as follows:

Depending from the forward ends of the beams 8 and rigid therewith are uprights 11 which support transversely extending vertically spaced beams 12. Extending between and secured to these beams at intervals along the same are vertical spindles or shafts 13, one for each topping unit.

Turnable on the spindle are vertically spaced collars 14 from each of which a pair of diverging arms 15 extends rearwardly, the arms being pivoted on transverse axes on the collars. At their rear ends these arms (which are all the same length) are pivoted on a vertically extending frame member or bracket 16 provided intermediate its ends with a rearwardly extending handle-bar 17. This frame or bracket supports a pair of transversely spaced electric motors 18 set on vertical axes and directly connected to depending shafts 19 on the lower ends of which horizontal topping discs 20 are mounted.

The spacing of the motors and connected parts is such that the discs are positioned to conform to the standard spacing of two adjacent rows of onions 21, as shown in Fig. 2. Projecting forwardly and downwardly from the bracket 16 centrally between the discs is a bar 22 from which a number of diverging and rearwardly projecting finger bars 23 extend to terminations outwardly and rearwardly of the disc shafts as shown. Turnably mounted on the bar 22 at its lower end is a vertically positioned cutting disc 24.

The entire unit is yieldably suspended, for both vertical and lateral movement about the connection of the arms 15 with the shaft 13 as an axis, by a pair of tension springs 25 which are connected to the bracket 16 centrally of its width, and extend thence upwardly and forwardly in diverging relation to a connection with the upper beam 12, as shown in Fig. 2. Current for the electric motors is provided from a generator 26 which is driven from the main gas engine of the apparatus by suitable connections; the cables 27 from the generator to the motor having the necessary slackness and flexibility where they pass over the hinged connection of the main and auxiliary frames, as shown in Fig. 1.

The beams 8 are a sufficient height from the ground to enable the operators occupying seated positions thereunder while being clear of the ground. To thus support the operators in such positions seats 28 (one for each topping unit) and provided with foot rests 29 are mounted under the beams 8 in fixed connection therewith and rearwardly of the corresponding topping units. Each seat is disposed so that its occupant can conveniently grasp the adjacent handle 17 and so that while seated his eyes may be in substantially direct overhanging relation to the topping discs, so that he may readily see the onions and the position and action of the discs thereon, and can control such position accordingly.

Pivoted at its rear end on the rear end of the frame 1 is an onion conveyor 30, having a downward slant toward its forward end and terminating in a transverse digging blade 31 which is positioned a short distance rearwardly of the front wheels 2. This conveyor is suspended and the level of its front end controlled by a suitable hoist device 32 supported on the frame 1.

The width of the conveyor and digging blade is such that it will act on as many rows of onions as are topped by the different topping units. This conveyor delivers at its rear end into sacks 33 supported on trip platforms 34, this apparatus being preferably the same as that shown in my Patent No.1,639,832 dated August 23, 1927.

In operation the machine is advanced along the rows of onions, its movement being controlled by an operator stationed on the frame 1 so that he can manipulate the wheels 2. Each operator occupying a seat 28 grasps the adjacent handle 17 and as the discs approach successive onions he raises or lowers the units secured to the handle 17 so that the discs cut the tops 21ª of the onions at the proper level. The particular mounting of the units enables them to be not only raised, but also to be shifted laterally as may be necessary to properly line the discs up with the onions; and the spring suspension means of the units of course enables the same to be very easily manipulated by moving the handle 17 without any heavy physical effort being necessary.

As the onion tops are cut off the finger bars 23 deflect the same outwardly so that they fall in windrows to the sides of adjacent pairs of rows of onions as shown. Should any tops possibly droop over into the space between adjacent rows, the forward vertical cutter 24 will sever the same from the onions. The topped onions are then engaged by the blade 31 and conveyed by the conveyor 30 to the sacks.

When it is desired to transport the machine while not in use the frame 8 is raised by operating the hoist 10, which draws the topping units depending from said frame well clear of the ground.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. In an onion harvester, a frame structure, means supporting said structure in spaced relation to the ground for movement along the same, a topping unit under said structure, means connecting the unit to the structure for both vertical movement and lateral swinging movement relative thereto, and hand controlled means for thus moving the unit.

2. In an onion harvester, a frame structure, means supporting said structure in spaced relation to the ground for movement along the same, a topping unit under said structure, means flexibly connecting the unit to the structure for free vertical movement relative thereto, spring balancing means between said unit and structure, and a handle rigid with said unit for moving the same up or down.

3. In an onion harvester, a frame structure, means supporting said structure in spaced relation to the ground for movement along the same, a topping unit under said structure, means connecting the unit to the structure for vertical adjustment relative thereto, a handle rigid with and projecting rearwardly from said unit, and a seat fixed with said frame structure rearwardly of the unit and positioned relative to the handle to enable the occupant of the seat to conveniently manipulate the handle.

4. In an onion harvester, a frame structure, means supporting said structure in spaced relation to the ground for movement along the same, a topping unit under said structure, and including a horizontal topping disc, and an electric motor directly connected to the same, a current generator mounted on the frame-structure supporting means, flexible conductors between said generator and motor, and means supporting said unit from the frame structure for vertical movement relative thereto.

5. In an onion harvester, a frame structure, means supporting said structure in spaced relation to the ground for movement along the same, a vertical shaft under and supported by said structure, vertically spaced collars turnable on said shaft, arms pivoted on transverse axes on said collars and projecting rearwardly therefrom, a vertical bracket onto which the rear ends of the arms are pivoted, a topping device supported by the bracket and including a horizontal topping disc, and means connected to the bracket for enabling the vertical or lateral movement of the same to be manually controlled.

6. A structure as in claim 5, with counterbalance means between the bracket and frame structure.

7. A structure as in claim 5, with tension springs connected at their rear ends on the bracket and projecting thence forwardly and upwardly in diverging relation to each other to connections with the frame structure.

In testimony whereof I affix my signature.

ROSCOE C. ZUCKERMAN.

CERTIFICATE OF CORRECTION.

Patent No. 1,748,745.  Granted February 25, 1930, to

ROSCOE C. ZUCKERMAN.

It is hereby certified that error appears in the printed specification of the above numbered patent requiring correction as follows: Page 1, line 8, for "Ser. No. 414,094" read "Ser. No. 414,084"; and that the said Letters Patent should be read with this correction therein that the same may conform to the record of the case in the Patent Office.

Signed and sealed this 13th day of May, A. D. 1930.

(Seal)

M. J. Moore,
Acting Commissioner of Patents.